United States Patent

Gaggiano

[11] 4,101,138
[45] Jul. 18, 1978

[54] GASKET FOR INTERNAL COMBUSTION ENGINES, INCORPORATING LOCATING PINS

[75] Inventor: Nicola Gaggiano, Turin, Italy

[73] Assignee: FIAT Societa per Azioni, Turin, Italy

[21] Appl. No.: 853,793

[22] Filed: Nov. 21, 1977

[30] Foreign Application Priority Data

Nov. 25, 1976 [IT] Italy ............................... 53664/74[U]

[51] Int. Cl.² .............................................. F16J 15/02
[52] U.S. Cl. ..................................... 277/11; 277/136; 277/166; 123/193 CH
[58] Field of Search ............... 85/1 JP; 220/304, 378, 220/DIG. 3, DIG. 19; 277/9, 9.5, 11, 136, 166, 168–172, 178, 167.5, 235 B; 285/379, 380; 123/193 CH, 193 H, 90.37

[56] References Cited

U.S. PATENT DOCUMENTS

| 1,363,119 | 12/1920 | Johnson | 123/193 CH X |
| 1,694,291 | 12/1928 | Sywert | 220/DIG. 3 X |
| 2,209,403 | 7/1940 | Kittner et al. | 220/DIG. 3 X |
| 3,331,610 | 7/1967 | Olson | 277/171 X |
| 3,586,338 | 6/1971 | Miklau et al. | 277/235 B X |

FOREIGN PATENT DOCUMENTS 166,669  1/1906  Fed. Rep. of Germany ....... 277/166

Primary Examiner—Robert S. Ward, Jr.
Attorney, Agent, or Firm—Sughrue, Rothwell, Mion, Zinn and Macpeak

[57] ABSTRACT

A vibration-dampening gasket of elastic material for interposition between upper and lower blocks of an internal combustion Diesel or Otto cycle engine has integral locating pins for force-fitting engagement in holes in the lower engine block and a greater thickness than a seat in which it is fitted so as to be compressed upon assembly of the engine.

3 Claims, 4 Drawing Figures

GASKET FOR INTERNAL COMBUSTION ENGINES, INCORPORATING LOCATING PINS

The present invention relates to improvements in gaskets, for use in the assembly of cylinder blocks of "Diesel" and "Otto" cycle internal combustion engines.

In these types of internal combustion engine, which have compression-ignition systems, high internal pressures are developed which together the reciprocating reaction loads caused by the pistons, give rise to alternating loads on the mechanical elements of the engine, particularly the cylinder block and the crankshaft bearing supports.

In order to reduce such vibrations and the troublesome noise which they cause, it is known to provide a cast lower engine block in which crankshaft bearing supports are cast directly, as described in Italian Utility Model No. 165,205 granted May 7, 1977.

The principal object of the present invention is to provide a gasket which, apart from being precisely positioned, in the assembly of an engine, in a lower engine block, is also capable of having a high vibration damping effect.

Accordingly the present invention provides a gasket of elastic material for interposition between upper and lower engine blocks of a "Diesel" or "Otto" cycle engine, in which for the purpose of providing for accurate location and vibration damping, in addition to its sealing function, the gasket is formed in a single piece with a shape corresponding to that of the mating profile of the lower engine block, and the gasket embodies locating pins made of the same material as the gasket, for engagement in corresponding holes in the lower engine block.

The improved engine gasket according to the invention has a simple construction and tends to lengthen the operational life of an engine, thereby achieving obvious economic advantages.

The invention will be further described, by way of example, with reference to the accompanying drawings, in which.

Figure 1:
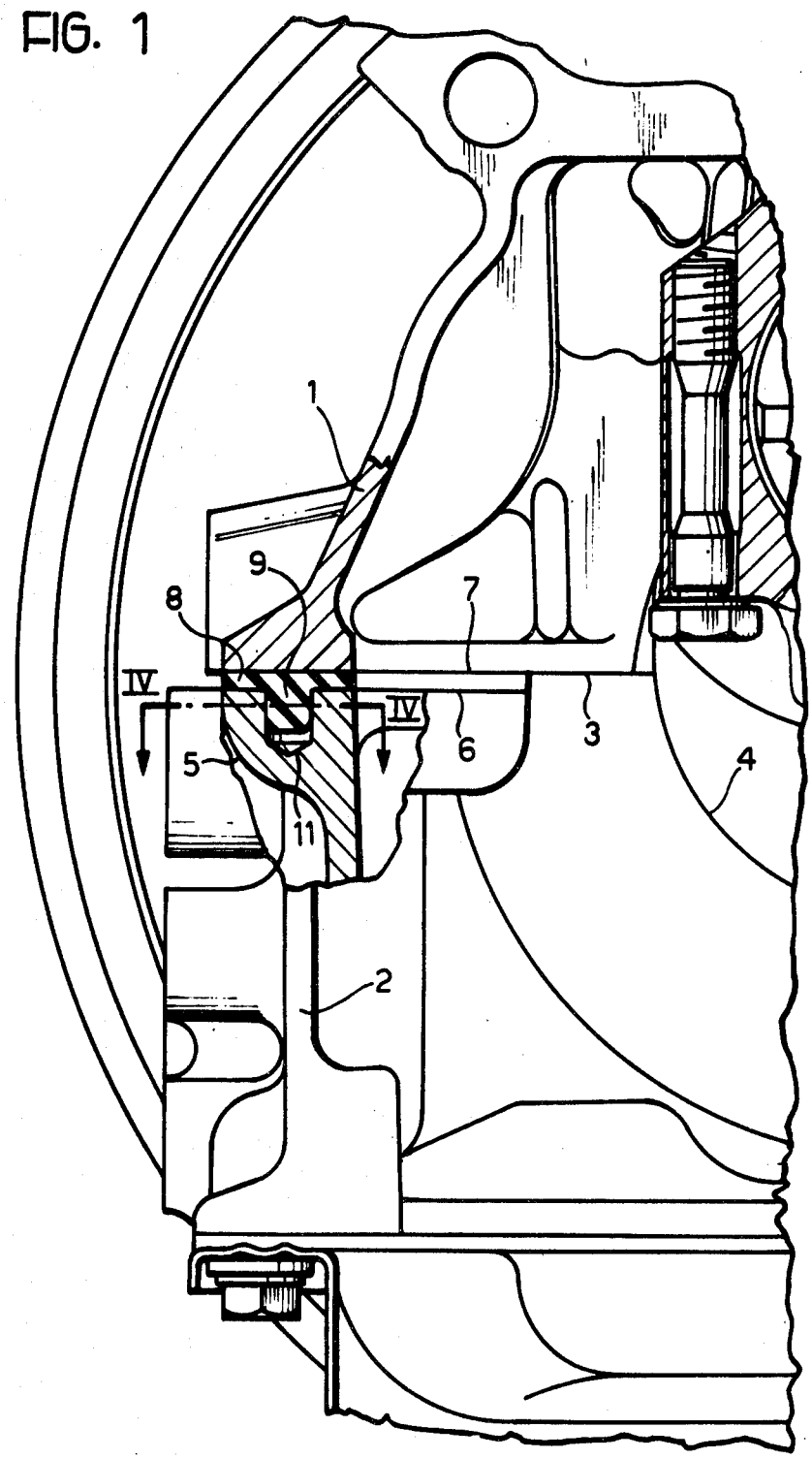
FIG. 1 is an end elevational view, partly in section, of part of a "Diesel" type internal combustion engine incorporating a gasket according to one embodiment of the present invention.

With reference to the drawings, reference numeral 1 indicates part of an upper engine block incorporating the cylinder bores of the engine. A lower engine block 2 is secured to the bottom of the upper block 1.

The lower engine block 2 is formed as a single unitary structure by casting, the only surface which is machined to a high degree of finish being that indicated by 3, which makes contact with a corresponding flat lower face 7 of the upper engine block. Adjoining the surface 3 is a part-cylindrical surface 4 which serves to support a crankshaft bearing of the engine. A rebated flat face 6 is machined symmetrically on the outer parts of the surface 3 to form, with the cooperating lower face 7 of the upper engine block 1 a seat for an oil sealing gasket 8.

Figure 2:
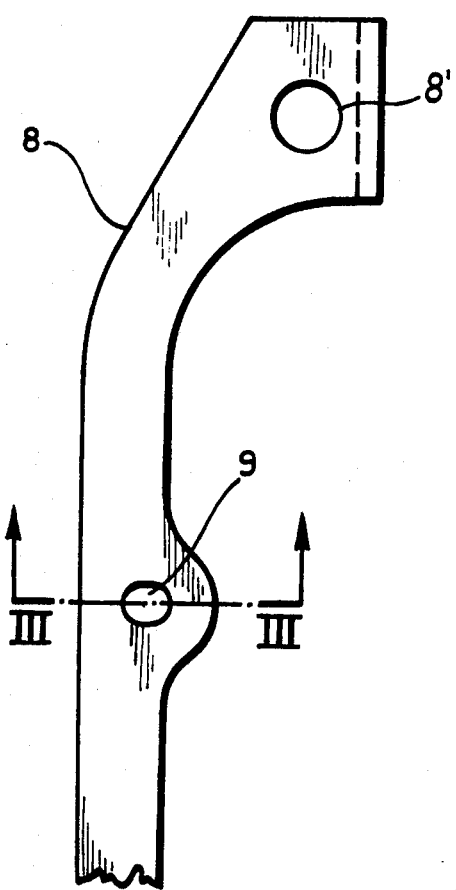
FIG. 2 is a detailed plan view of part of the gasket employed in the engine of FIG. 1.
Figure 3:
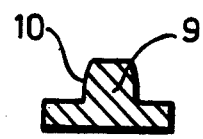
FIG. 3 is a cross section taken along the line III—III of FIG. 2.
Figure 4:
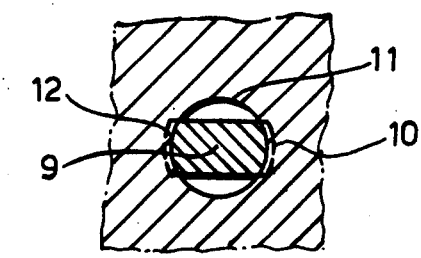
FIG. 4 is a cross section on an enlarged scale of part of the lower block of the engine shown in FIG. 1 taken in correspondence with a locating pin of the gasket along the line IV—IV of FIG. 1.

The gasket 8, which is made in one piece of elastic material, for example, rubber, is shaped so as to mate with the structure of the lower engine block 2 and has holes 8' (one of which is shown in FIG. 2) for the passage of centering dowels extending between the upper and lower engine blocks 1, 2, and for the passage of lubrication oil pipes. The gasket 8 is formed with a series of integral locating pins 9 made of the gasket material 8, each having a circumferential portion 10 of greater nominal transverse dimension than the corresponding dimension of respective blind holes 11 in the face 6 of the lower engine block 2 into which the pins 9 fit with an interference 12 (FIG. 4). This permits force-fitting of the pins 9 into the holes 11, in the lower engine block 2 and compensates for any axial misalignment which may exist between the said pins 9 and holes 11.

Upon assembly of the engine the gasket 8 which in its uncompressed state has a greater thickness than that of the seat formed between the faces 6 and 7, is fitted with its pins 9 engaged in the holes 11, and is then subjected to a compression when the two engine blocks 1 and 2 are clamped together. This ensures effective sealing against the escape of oil, and affords a vibration dampening action with a consequent reduction in engine operating noise.

In the course of the assembly and squashing of the gasket 8 the latter will be prevented from displacement from its seat by the locating pins 9. Furthermore, because of the interference fit of the pins 9, that is, the force-fitting of the pins 9 in the holes 11, the gasket 8 will not become detached or displaced, even when the lower engine block 2 is inverted for its fixing to the upper engine block 1 upon assembly of the engine.

The present invention affords a gasket of simple construction which can easily be interposed between the upper and lower engine blocks, and which is capable of fulfilling various functions such as sealing, vibration damping and stability and accuracy of assembly.

It will be understood that constructional details of practical embodiments of the invention may be widely varied with respect to what has been described and illustrated, without departing from the scope of the present invention.

I claim:

1. In an internal combustion compression-ignition engine having upper and lower engine blocks, a vibration-damping gasket of elastic material for interposition between said engine blocks, wherein the gasket is formed In a single piece with a shape corresponding to that of the mating profile of the lower engine block, and wherein the gasket embodies locating pins, made of the same material as the gasket, for engagement in corresponding holes in the lower engine block.

2. A gasket of elastic material as defined in Claim 1, wherein the locating pins have an increased transverse dimension with respect to the holes in the lower engine block into which they fit so that they can be force-fitted with interference into said holes.

3. A gasket of elastic material as defined in Claim 1, wherein the thickness of the gasket is greater than that of a seat between the engine blocks in which the gasket fits, so that the gasket becomes compressed upon fitting and assembly of the engine to perform the double function of sealing and vibration-damping.

* * * * *